April 23, 1935. W. H. FOSTER 1,998,986
AUTOMATIC COMPENSATING FRICTION CLUTCH
Filed June 17 1932 2 Sheets-Sheet 1
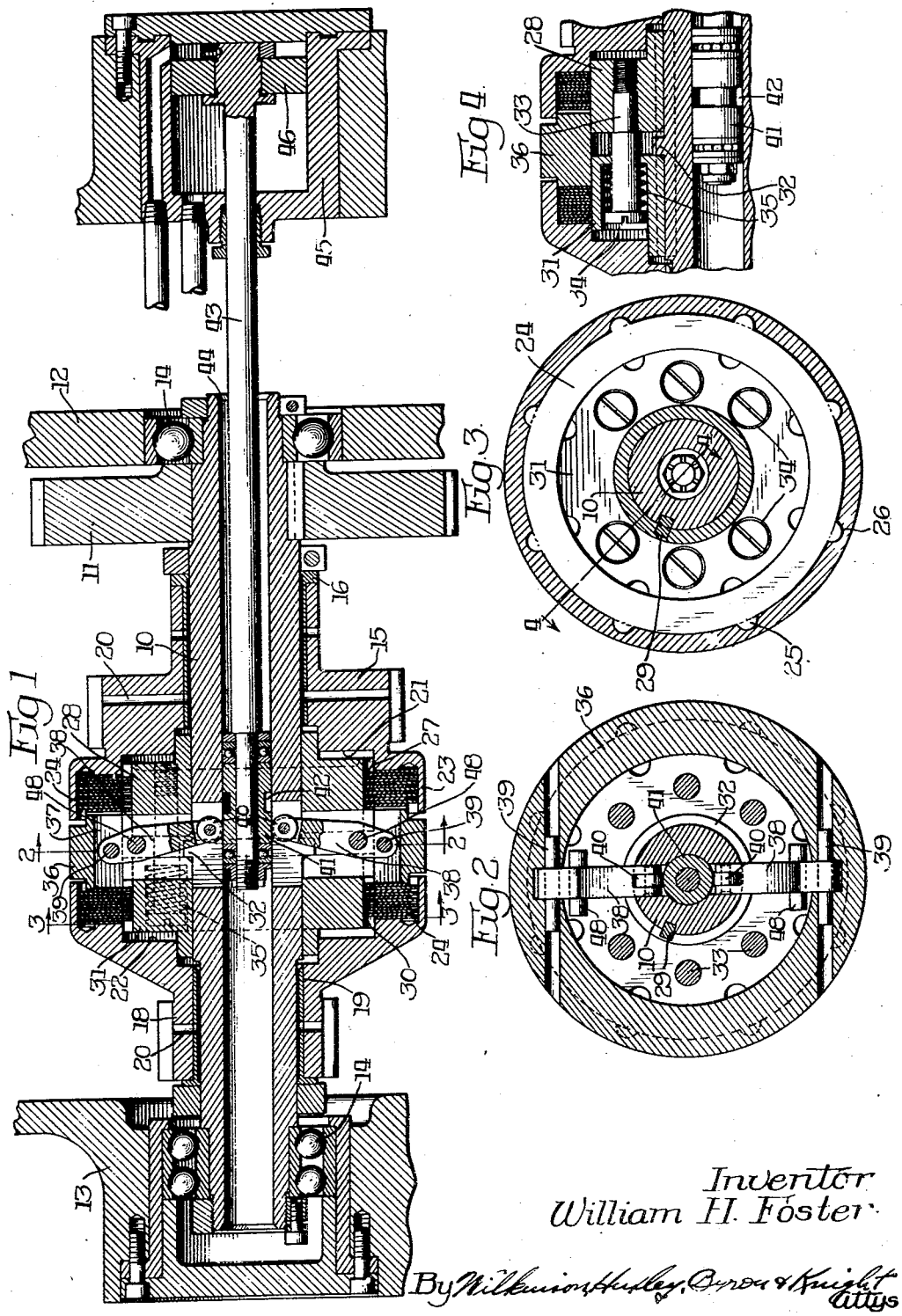
Inventor
William H. Foster April 23, 1935. W. H. FOSTER 1,998,986
AUTOMATIC COMPENSATING FRICTION CLUTCH
Filed June 17, 1932 2 Sheets-Sheet 2
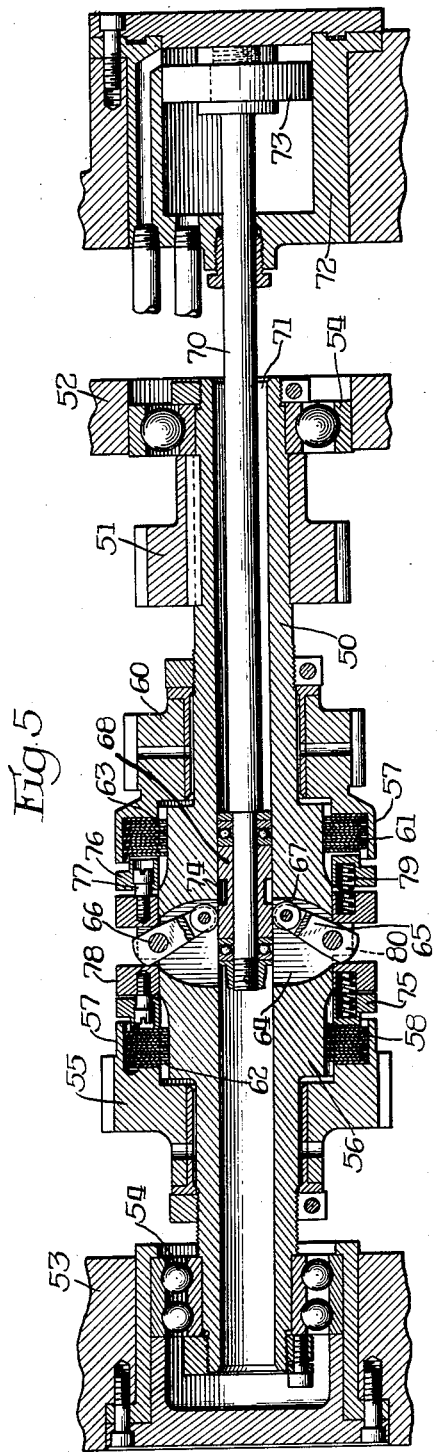
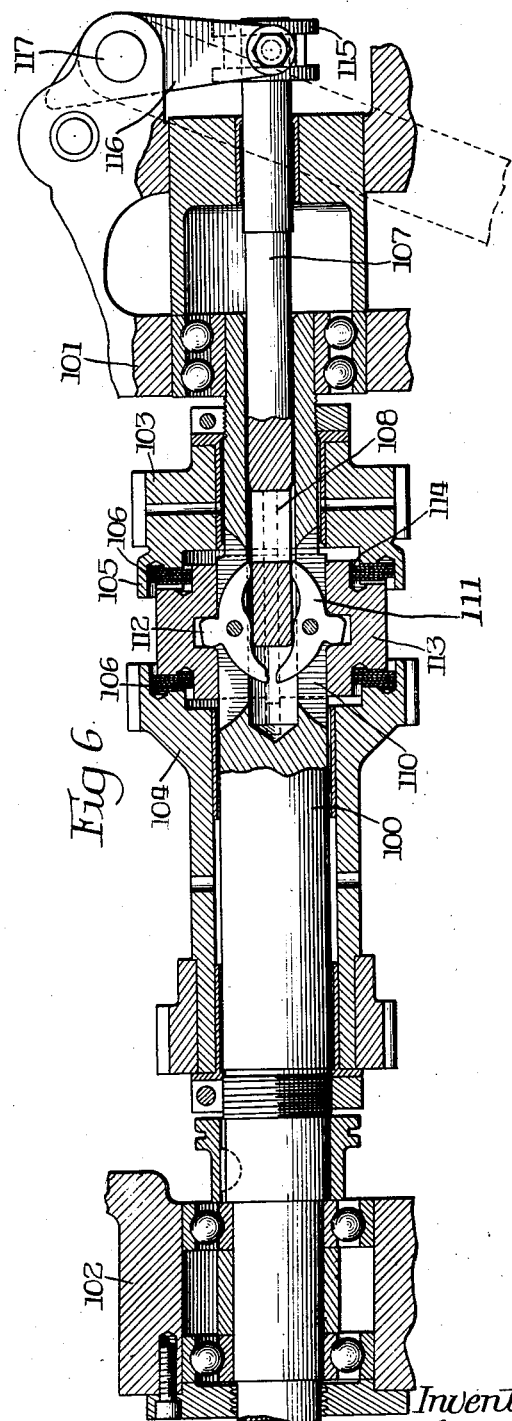
Inventor
William H. Foster
By Wilkinson Hulley, Byron & Knight
Attys Patented Apr. 23, 1935

1,998,986

UNITED STATES PATENT OFFICE 1,998,986

AUTOMATIC COMPENSATING FRICTION CLUTCH

William H. Foster, Elkhart, Ind.

Application June 17, 1932, Serial No. 617,809

14 Claims. (Cl. 192—69)

The invention relates to improvements in clutch mechanism for transmission gearing and has reference more particularly to clutch mechanism for producing automatic speed changes in lathes and other machinery.

An object of the invention is to provide clutch mechanism which will retain its full driving power even after considerable wear of the parts has taken place. Clutches of the present type are therefore especially adapted for automatic speed changing mechanisms such as employed in lathes and other machine tools where the operator does not have means for testing the adjustment of the clutch from time to time. In common types of positively adjusted clutches, which lose their pulling power with any slight wear, slippage often occurs sufficient to ruin cutting tools or cause other serious damage before the operator is aware of the fact that the clutch is too loose.

Another object is to provide clutch mechanism which will operate with a minimum time interval between disengagement of one side of the clutch mechanism and engagement of the other side. In all clutch mechanisms there is a momentary period of time during operation when neither side of the clutch is transmitting power, and it is essential in clutch mechanisms for machine tools that the shift be made as quickly as possible and with the least perceptible stopping of the spindle.

A further object is to provide an improved clutch mechanism for speed changing in connection with power transmission in which the gears will always be in mesh, which will eliminate the necessity for periodical adjustment, and wherein the operation of clutching will take place without subjecting the mechanism to severe strains.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a fragmentary longitudinal sectional view taken through the headstock of a lathe and showing one of the driving shafts forming the power transmission means equipped with the clutch construction of the present invention;

Figure 2 is a transverse sectional view taken centrally through the clutch on a plane indicated by line 2—2 of Figure 1;

Figure 3 is a transverse sectional view taken on a plane indicated by line 3—3 of Figure 1;

Figure 4 is a fragmentary detail view taken on line 4—4 of Figure 3;

Figure 5 is a fragmentary sectional view similar to Figure 1 but showing a modified form of clutch construction, and Figure 6 is a view similar to Figure 1 showing another modified form of clutch construction.

Referring more particularly to Figures 1 to 4 inclusive of the drawings, the driving shaft 10 having a gear 11 fixedly secured thereon is mounted for rotation within frame members 12 and 13 by means of the ball bearing races 14. Gear 11 is driven by any suitable form of power, either directly connected thereto or indirectly through gearing forming part of the speed changing mechanism of the lathe. From shaft 10 the power is transmitted to other means through gear 15, rotatably mounted on the shaft by means of bearing 16, or through pinion 18 also rotatably mounted on the shaft by bearing 19. Both gear 15 and pinion 18 are bored at 20 so that grease or other lubrication will be supplied to the bearings to minimize friction between the parts.

The adjacent faces of the gear and pinion are recessed at 21 and 22, respectively, for receiving parts of the clutch mechanism to be described. Internally of the shoulders 23 formed by the recesses are secured clutch discs 24, the discs being non-rotatably united to both gear and pinion, respectively, by the provision of protuberances 25 provided on the periphery of the discs fitting in grooves 26 formed on the interior surface of the shoulders 23. Co-operating with discs 24 of gear 15 are discs 27 non-rotatably secured in a like manner to the periphery of the clutch member 28 keyed by key 29 to the driving shaft 10 but having limited longitudinal movement thereon as will be understood by reference to Figure 4. The clutch discs 24 on pinion 18 co-operate with similar discs 30, non-rotatably secured to the periphery of member 31, keyed by 29 to the shaft 10 but having limited longitudinal movement on the shaft. The shaft 10 between the clutch members 28 and 31 is provided with an integral shoulder 32 against which the inner surfaces of the clutch members engage during clutching. This will be apparent from Figure 4 which shows resilient coupling means for the clutch members including studs 33 securely threaded at their right hand end to member 28 and having their headed ends received within openings 34 in member 31 with coil springs 35 positioned on the shanks of the studs between the base of the opening and the heads of the studs. In the particular embodiment disclosed six of these studs serve to resiliently couple the clutch members, which, when inoperative, are thus held against the central shoulder 32 on shaft 10. The number of coupling studs employed and the compression exerted by the individual springs 35 is determined by the maximum driving power transmitted by the clutch. For any particular driving power the compression of the springs must be sufficient to cause engagement of the discs so that full power is transmitted with no slippage between the discs taking place.

Positioned between the gear 15 and pinion 18 and adjacent the clutch discs described is a clutch ring 36, said clutch ring being concentric with respect to the clutch members 28 and 31 and mounted for movement on the peripheries of the members. At points diametrically opposite each other on the interior surface of the ring are provided slots 37 for receiving fingers 38 pivotally secured to the ring at their outer ends by pins 39. On the inner ends of the fingers are located rollers 40 contacting with spool 41 having an annular groove 42 and rotatably mounted on the operating rod 43. The driving shaft 10 is provided with a central bore 44 within which the spool reciprocates, the movement of the same being effected automatically by means of the oil cylinder 45 and piston 46.

Intermediate the ends of the fingers 38 are fixedly secured pins 48 located between the clutch members 28 and 31 which provide fulcruming means for the fingers when the same are caused to move toward the right or left. When the clutch is in neutral position the rollers 40 have location in the annular groove 42 on the spool and thus the pins 48 will be located exactly centrally of the clutch members, permitting the members to engage the shoulder 32. In this position of the fingers 38 the clutch ring 36 will also be positioned centrally between the adjacent faces of the gear 15 and pinion 18 and neither set of clutch discs will be engaged. Therefore, neither the gear nor the pinion will transmit rotations from the driving shaft 10.

When the spool 41 is withdrawn to the right, as shown in Figure 1, the fingers are positioned so that the pins 48 engage the clutch member 28 fulcruming on the member and forcing the clutch ring toward the left, compressing the clutch discs 24 and 30, whereupon driving will take place between shaft 10 and pinion 18. The application of pressure by the clutch ring 36, causing engagement of the clutch discs, is through resilient means, since the member 28 is forced to the right, compressing the coil springs 35 and holding member 31 firmly against shoulder 32.

To cause disengagement of the clutch discs 24—30 and engagement of discs 24—27 the spool 41 is forced to the left automatically through the pressure cylinder disclosed or by manual means, locating the rollers 40 on the fingers to the right of the annular groove 42. For this clutching operation the pins 48 fulcrum on member 31, compressing the coil springs 35 and simultaneously forcing the clutch ring 36 to the right operatively connecting the driving shaft with gear 15.

The form of clutch shown in Figure 5 is likewise associated with a driving shaft 50 having fixedly secured thereto gear 51 and being rotatably mounted in side frames 52 and 53 by means of ball bearing races 54. Mounted on the shaft so as to have rotation independently thereof is a gear 55 having a recessed face for receiving one end of an enlarged portion 56 formed on the driving shaft, which recess provides an annular shoulder 57 having non-rotatably secured on its interior surface discs 58. Also positioned on the driving shaft for rotation relative thereto is a pinion 60 having a recessed face for receiving the other end of the enlarged portion 56 and having secured to the annular shoulder 57 clutch discs 61 in a manner as described with respect to gear 55 and more particularly described with reference to the construction of Figure 1.

Secured to the periphery of portion 56 at its respective ends are discs 62 located within the recess on gear 55 for co-operation with discs 58 on the gear and other discs 63 located within the recess on pinion 60 for co-operation with the disc 61 on the pinion. The portion 56 is provided with diametrical slots 64 for receiving the fingers 65 pivoted at 66 and having rollers 67 on their inner ends for engaging with a spool 68 mounted for rotation on the operating rod 70. The driving shaft is provided with a central bore 71 within which the spool reciprocates, the movements thereof being imparted either manually or automatically by the pressure cylinder 72 and piston 73 secured to the outer end of the rod. Movement of the spool within bore 71, by reason of the annular groove 74 formed on the spool will impart pivotal movement to the fingers 65 to cause actuation of the clutch in a manner similar to that described with respect to Figure 1.

In this modification a plurality of clutch rings are provided, ring 75 being positioned adjacent gear 55 for applying pressure to the set of clutch discs 58—62, while ring 76 is located adjacent pinion 60 for applying pressure to the set of clutch discs 61—63. Each ring is connected by studs 77 to a clutch member 78, the rings and clutch members being maintained in spaced relation as far as studs 77 will allow by means of the resilient springs 79.

It will be observed that ring 75 and its associated clutch member are concentric with portion 56 and are mounted on the periphery of the portion to the left of fingers 65, and that ring 76 and associated clutch member is also concentric and mounted on the portion to the right of the fingers. With the clutch in neutral position the rollers 67 will be positioned in groove 74 in the spool, positioning the fingers substantially vertical. With the fingers in this position the clutch members 78 are free to engage the annular shoulder 80 provided on the enlarged portion 56, thus locating the various clutch rings out of contact with their adjacent discs. Movement of the spool toward the right will actuate the fingers, causing their outer ends to engage the left clutch member, compressing springs 79 and forcing the ring 75 into engagement with the clutch discs. This pressure on the discs serves to operatively connect the driving shaft with gear 55, whereupon the transmission of power takes place through the gear. Movement of the spool toward the left will reverse the position of the fingers from that shown in Figure 5, whereupon engagement between the fingers and the right clutch member will take place, forcing, by the compression of springs 79, the ring 76 against the discs, operatively connecting the pinion 60 to the driving shaft.

In both modifications thus far described the clutch ring is resiliently applied to the discs, compressing the discs and connecting a gear with the shaft, whereby the rotations of the shaft may be transmitted to other means through the gearing or vice versa. The above is accomplished in Figure 1 by coupling the clutch members and holding them against separation by resilient means so that actuation of the ring serves to separate the members against the tension of the resilient means. In Figure 5 two rings are provided, each being coupled to a clutch member and maintained in spaced relation by coil springs. Moving of a clutch member will compress the springs, forcing the ring against the discs and thus it will be seen that the discs are actuated through the resilient members. Even though the parts wear considerably full driving power is transmitted by the clutch as the springs apply substantially their full pressure against the discs. Also the construction has merit since disengagement of one clutch structure and the engagement of the other is accomplished with the least possible loss of time, as full driving power will be transmitted by the clutches until the last outward movement of the clutch member and likewise the discs will engage after initial inward movement of a clutch member, the remaining movement of the same only increasing the pressure exerted by the springs.

In Figure 6 still another modification of the present invention is disclosed which differs, however, from those described since pressure is directly applied against the clutch discs. The shaft 100, which may comprise a driving shaft, is mounted for rotation in spaced frame members 101 and 102 and has mounted thereon for rotation relative to the shaft gear members 103 and 104. Each gear member is recessed on its inward face, providing an annular shoulder 105 for receiving clutch discs 106. The shaft 100 is bored for a part of its length for receiving the operating rod 107 having slot 108. Pivotally secured in diametrical slots 110 in the shaft are members 111 having a projecting end 112 fitting in openings in the clutch member 113 concentric with the shaft and mounted for engagement axially thereof. Secured to the periphery of the clutch member are discs 114 co-operating with discs 106 on the gear members.

For actuating the clutch member for selectively connecting the driving shaft with gears 103 and 104 the rod 107 has suitably secured to its outer end a collar 115 connecting with arm 116 pivoted to the frame at 117. Rotation of 117 will serve to reciprocate the rod in the desired direction, causing rocking of members 111 pivoted to the shaft, which, through their projections 112 will cause movement of the clutch member 113 toward or away from the various clutch discs.

Although the shafts 10, 50 and 100 have been described as the driving element of the clutch mechanisms it is to be noted that the relationship of driving and driven elements may in some situations be reversed, in which instances the shafts 10, 50 and 100 would operate as driven shafts.

It is to be understood that I do not wish to be limited by the exact embodiments of the device shown which are merely by way of illustration and not limitation, as various and other forms of the device will of course be apparent to those skilled in the art without departing from the spirit of the invention or the scope of the claims.

I claim:

1. A clutch including a shaft and a member rotatable thereon having a plurality of friction discs, friction discs on the shaft alternating with discs on the member, a clutch ring located adjacent the discs for forcing the discs into frictional engagement, and means operative to cause movement of the ring toward the discs, said means including instrumentalities carried by the ring, and resilient members carried by the shaft whereby compression of the resilient members by the instrumentalities yieldingly applies the ring to the discs.

2. A clutch including a shaft and a member rotatable thereon having a plurality of friction discs, friction discs on the shaft alternating with the discs on the member, a clutch ring located adjacent the discs for forcing the discs into frictional engagement, and means operative to cause movement of the ring toward the discs, including fulcruming means carried by the ring, and resilient members carried by the shaft, said fulcruming means being pivoted to the ring and fulcruming on the shaft to compress the resilient members for yieldingly applying the ring to the discs.

3. A clutch including a shaft and a member rotatable thereon having a plurality of friction discs, friction discs on the shaft alternating with the discs on the member, a clutch ring located adjacent the discs for forcing the discs into frictional engagement, and means operative to cause movement of the ring toward the discs, including pivoted fingers carried by the ring, and resilient members carried by the shaft, said ring and fingers rotating with the shaft, and said fingers fulcruming on the shaft to compress the resilient members for yieldingly applying the ring to the discs.

4. A clutch including a shaft and a member rotatably mounted thereon, friction discs on the member, clutch members on the shaft for rotation therewith and having discs for frictional engagement with the discs on the member, resilient means connecting the clutch members, a ring for forcing the discs into engagement, and means pivoted to the ring and fulcruming on the clutch members for imparting movement to the ring.

5. A clutch including a shaft and a gear rotatable thereon, friction discs on the gear, a pair of clutch members on the shaft for rotation with the shaft, discs on the members for frictional engagement with those on the gear for connecting the gear with the shaft, means resiliently coupling the clutch members, a ring on the clutch members and operative to force the discs into engagement, fingers pivoted to the ring and fulcruming on the members, whereby movement of the fingers to actuate the ring tends to separate the resiliently coupled members applying the ring to the discs yieldingly.

6. In speed changing mechanism, a shaft, a pair of gears on the shaft to be selectively driven thereby, clutch means for each gear for connecting the gear with the shaft including discs on the gears, clutch members on the shaft for rotation thereby and having discs for frictional engagement with those on the gears respectively, resilient means coupling said members, a ring located between the gears for movement toward the discs, respectively, means pivoted to the ring and fulcruming on the members, whereby actuation of the means causes movement of the ring and separation of the clutch members, said separation of the members being resisted by the resilient means.

7. In speed changing mechanism, a shaft, a pair of gears on the shaft to be selectively driven thereby, clutch means for each gear for connecting the gear with the shaft including discs on the gears, members on the shaft for rotation thereby and having discs for frictional engagement with those on the gears respectively, resilient coupling means for the members, a ring located between the gears, fingers pivoted to the ring, and means for actuating the fingers to cause movement of the ring toward and away from the sets of discs respectively, actuation of the fingers serving to separate the members against the resilient coupling means, whereby the ring is applied to the discs yieldingly.

8. A clutch including a shaft having a plurality of friction discs and a gear rotatable thereon, friction discs on the gear for frictional engagement with the co-operating discs on the shaft, a ring on the shaft and movable toward the discs, a clutch member coupled to the ring and maintained in spaced relation with the ring by resilient members located between the ring and member, and means carried by the shaft for moving the clutch member axially of the shaft for forcing the ring against the discs, whereby the ring is yieldingly applied to the discs.

9. A clutch including a shaft having a plurality of friction discs and a gear rotatable thereon, friction discs on the gear for frictional engagement with the co-operating discs on the shaft, a ring on the shaft and movable toward the discs, a clutch member coupled to the ring and resilient means located between the member and ring for maintaining the parts in spaced relation, and fingers pivoted to the shaft and positioned for engagement with the clutch member, whereby actuation of the fingers will be transmitted through the resilient means to the ring.

10. A clutch including a shaft having a plurality of friction discs and a gear rotatable thereon, friction discs on the gear for frictional engagement with the co-operating discs on the shaft, a ring on the shaft and movable toward the discs, a clutch member coupled to the ring and resilient means located between the member and ring for maintaining the parts in spaced relation, fingers pivoted to the shaft and positioned for engagement with the clutch member, whereby actuation of the fingers will be transmitted through the resilient means to the ring, and means mounted for reciprocation axially of the shaft for actuating the fingers.

11. In speed changing mechanism, a shaft having a plurality of friction discs, a pair of gears on the shaft to be selectively driven thereby, clutch means for connecting the gears and shaft including discs on the gears for frictional engagement with the co-operating discs on the shaft, clutch rings on the shaft located adjacent the sets of discs respectively, said rings being movable for causing frictional engagement of the discs, and means coupled to each ring and held in spaced relation therewith by resilient members, whereby actuation of the means causes movement of the ring through compression of the resilient members.

12. A clutch including a shaft and a pair of spaced gear members rotatably mounted thereon, friction discs associated with each gear member, clutch members on the shaft for rotation therewith and having discs for frictional engagement with the discs on the gear members, respectively, resilient means coupling the clutch members and operating to draw said clutch members together, means on the shaft spacing said clutch members, a ring concentric with the clutch members and located between the gear members for forcing the discs into engagement, and means pivoted to the ring and fulcruming on the clutch members for imparting movement to the ring.

13. A clutch including a shaft and spaced gear members rotatably mounted thereon, friction discs associated with each gear member, clutch members keyed to the shaft but having axial movement therewith, said clutch members carrying discs for frictional engagement with the discs on the gear members respectively, means resiliently coupling the clutch members and holding the same normally in contact with a stop on the shaft, a ring concentric with the clutch members and located between the spaced gear members on the shaft for forcing the discs into engagement, fingers pivoted to the ring and fulcruming on the clutch members whereby movement of the fingers to actuate the ring tends to move one of the clutch members axially on the shaft in a direction away from its stop thus yieldingly applying the ring to the discs.

14. A clutch including a shaft connecting with a source of power for rotating the same, power transmitting means in the form of gear wheels rotatably mounted in spaced relation on the shaft, clutch means for each gear for connecting the gear with the shaft, said means including discs on the respective gears having frictional engagement with discs on the shaft, and a clutch member located between the gear and axially movable with respect to the shaft, an axially reciprocable rod carried within a central bore in the shaft, radial slots in the shaft communicating with the longitudinal bore, pivotally mounted fingers positioned in the slots and having their outer ends associated with the shaft and clutch member to cause axial movement of the clutch member upon pivotal movement thereof, rollers on the inner ends of said fingers, and a spool on the operating rod having a circumferential groove, said rollers engaging the periphery of said spool and being located in said circumferential groove upon axial movement of the operating rod to thereby cause pivotal movement of the fingers.

WILLIAM H. FOSTER.